United States Patent [19]
Steele

[11] Patent Number: 6,074,136
[45] Date of Patent: Jun. 13, 2000

[54] MULTI-PORT PNEUMATIC SWITCH

[75] Inventor: James R. Steele, Stillwater, Minn.

[73] Assignee: Dynamic Air Inc., St. Paul, Minn.

[21] Appl. No.: 09/014,258

[22] Filed: Jan. 27, 1998

[51] Int. Cl.[7] .................................................. B65G 51/24
[52] U.S. Cl. ............................................................ 406/182
[58] Field of Search .................................. 406/182, 181, 406/195, 193, 31 A

[56] References Cited

U.S. PATENT DOCUMENTS

| | | | |
|---|---|---|---|
| 4,063,572 | 12/1977 | Anderegg et al. | 406/182 |
| 4,252,479 | 2/1981 | Scherfenberg | 406/182 |
| 4,264,244 | 4/1981 | Steele | 406/182 |

*Primary Examiner*—Kenneth W. Noland
*Attorney, Agent, or Firm*—Jacobson and Johnson

[57] ABSTRACT

A multi-port pneumatic switch having a drive system including a motor and a gear reduction box that rotates a rotatable plate which carries a rotateable conduit having an offset end and a non-offset end with the offset end postionable into precise flow alignment with any of a plurality of outlet conduits through the coaction of a photoelectric alignment system that detects a light beam reflection from a reflector on the rotatable plate to immediately shut the power to the drive system and thereby stop further forward rotation of the rotatable plate. With the cessation of power to the drive system a pivotal arm swings into engagement with a radial stop on the rotatable plate to lock the rotatable plate from further forward rotation while the drive system which is powered through a gear reduction drive functions as brake to prevent back rotation of the rotatable plate once the power is shut off to the motor. The coaction of the stops and the drive system brake maintain the rotateable conduit in precise flow alignment with one of the outlet conduits while a set of annular inflatable seals can be inflated to permit one to seal and secure the ends of the rotateable conduit in the flow condition once the conduits are in proper alignment. A set of peripheral flange rollers permits the non-offset end of the rotateable conduit to be rotated about a central axis.

18 Claims, 6 Drawing Sheets

MULTI-PORT PNEUMATIC SWITCH

FIELD OF THE INVENTION

This invention relates generally to pneumatic conveying systems and, more particularly, to improvements in multi-port pneumatic switches for pneumatic conveying systems that uses an offset conduit that has one end that is maintained in concentric alignment with a first conduit and a second offset end that can be rotated into alignment of any of a number of other conduits.

BACKGROUND OF THE INVENTION

In pneumatic conveying lines granular or non-granular material is transported from one location to another. Often times, at selected intervals, it is necessary to divert the conveyed material into different pneumatic conveying lines. To switch or divert the material from one pneumatic conveying line to another pneumatic conveying line requires a pneumatic switch. One of the requirements of the switch is that the switch must be able to seal the pneumatic conveying line when the material being transferred is directed from one pneumatic conveying line to another pneumatic conveying line. Not only does the switch need to effectively seal the pneumatic conveying lines, but the pneumatic conveying lines needs to be properly aligned. That is, it is necessary that the end of the conduits be brought into proper alignment with the selected outlet port to enable the conduit to be properly sealed, but to also ensure that the conduits are not located off center which can produce ridges where material can accumulate The present invention provides a multi-port switch with multiple outlet conduits that can be precisely aligned with one end of an offset rotatable conduit that is carried by a rotatable plate that carries a locator reflector that interacts with a light beam from a photoelectric alignment system when the conduit ends are in proper alignment to stop further rotation of the offset conduit while a mechanical engageable stop prevents further forward rotation of the offset conduit and a drive system that functions as a brake to prevent back rotation of the rotatable plate and the offset conduit carried thereon

DESCRIPTION OF THE PRIOR ART

U.S. Pat. No. 4,252,479 disclose a rotary pneumatic switch where the seal is provide by a pair of annular inflatable seal that provide sealing on both ends of a pneumatic conveying tube.

U.S. Pat. No. 4,264,244 discloses a rotary diverter valves with interchangeable inlet and outlet passages with an annular seal that mates to a curved surface.

SUMMARY OF THE INVENTION

Briefly, the present invention comprises a multi-port pneumatic switch having a drive system including a motor and a gear reduction box that rotates a rotatable plate about a central axis with the rotatable plate carrying a rigid rotateable conduit having a non-offset end that is circumferentially supported by peripheral rollers and an offset end with the offset end postionable into precise flow alignment with any of a plurality of outlet conduits through a photoelectric alignment system that detects a light beam reflection from a reflector on the rotatable plate. A signal from the photoelectric alignment system shuts the power off to the drive system and thereby stops further forward rotation of the rotatable plate and the rotatable conduit. With the cessation of power to the drive system a pivotal arm swings into engagement with a radial stop on the rotatable plate to lock the rotatable plate from further forward rotation while the drive system, which is powered through a gear reduction drive, functions as brake to prevent back rotation of the rotatable plate once the power is shut off to the motor. The coaction of the stop and pivotal arm with the drive system brake maintain the rotateable conduit in precise flow alignment with one of the outlet conduits. A set of annular inflatable seals can be inflated to permit one to seal and secure the ends of the rotateable conduit in the flow condition once the conduits are in proper alignment. A set of peripheral flange rollers permits the non-offset end of the rotateable conduit to be rotated about the central axis.

DESCRIPTION OF THE PREFERRED EMBODIMENT

Figure 1:
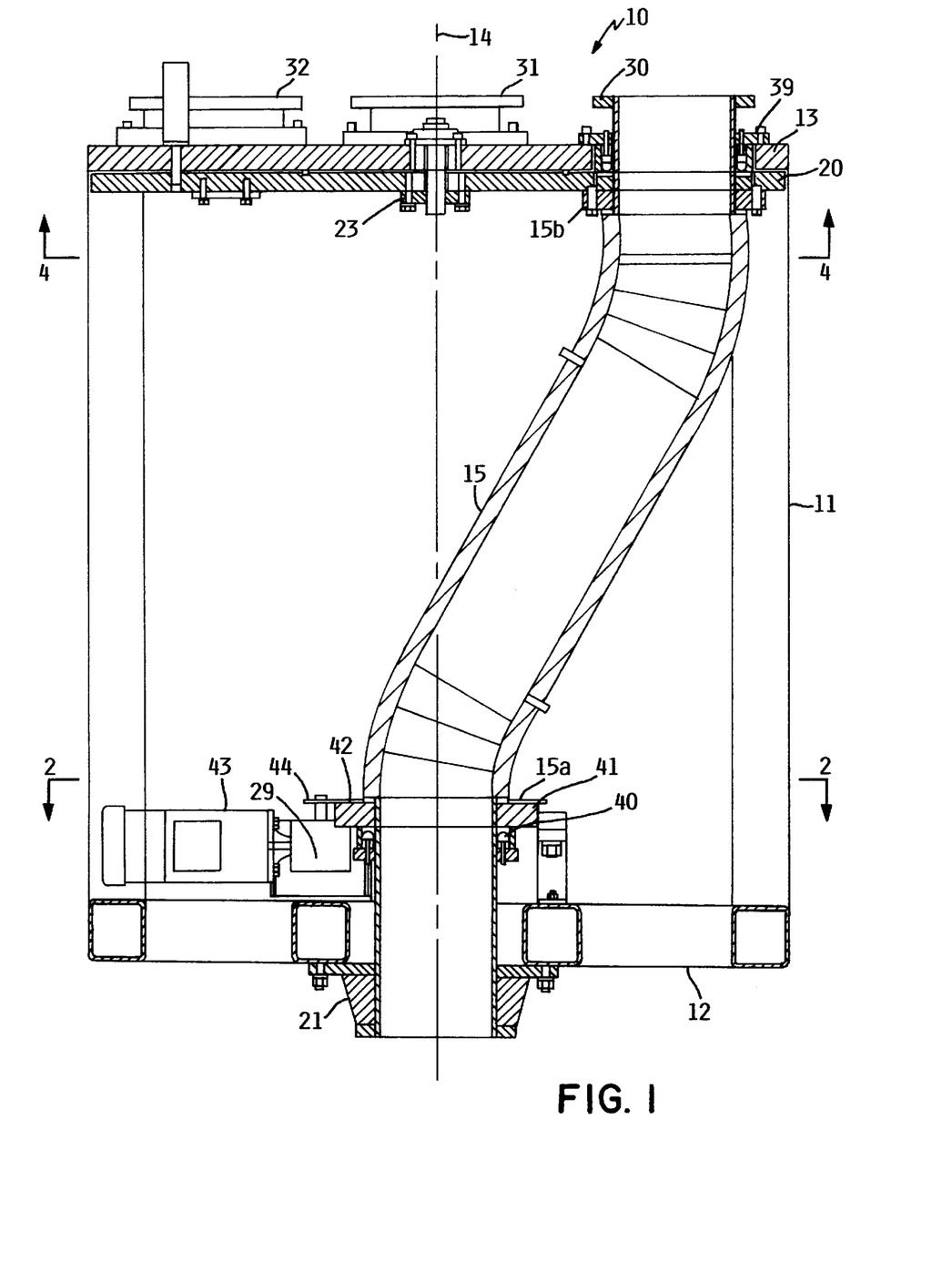
FIG. 1 is a cross-sectional view of a multi-port switch.
Figure 2:
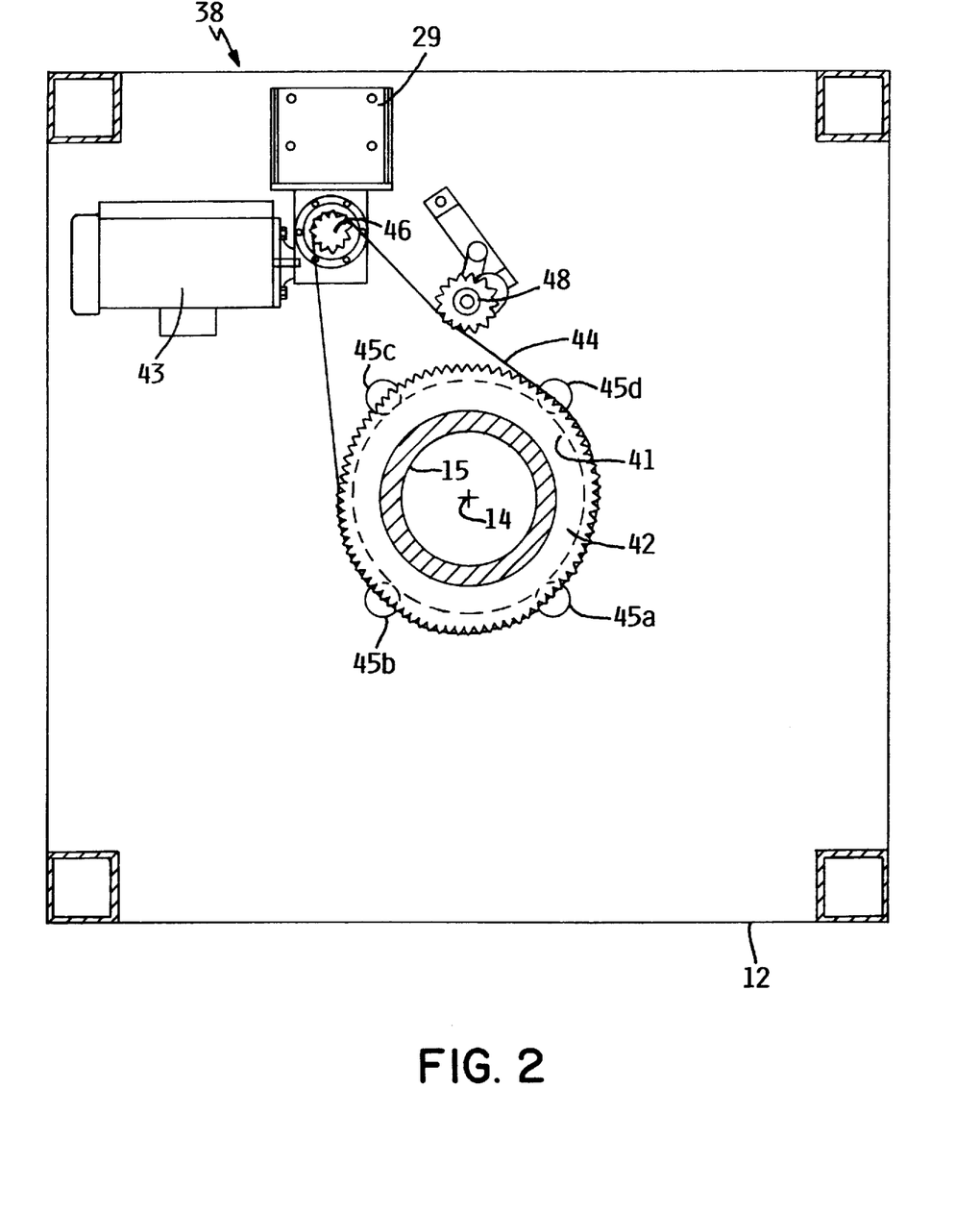
FIG. 2 is a cross-sectional view of a multi-port switch taken along lines 2—2 of FIG. 1.

FIG. 1 shows a multi-port switch 10 comprising a switch housing 11 having a first housing end member 12 and a second housing end member 13 with a central axis 14 extending through first housing end member 12 and second housing end member 13. Located in switch housing 11 is a rigid, repositionable or rotateable offset conduit 15 having one end affixed to rotatable plate 20 and a free end 15a cantilevered out therefrom but rotatably supported around the flanged exterior of free end 15a by a set of peripheral rollers 45a, 45b, 45c and 45d (FIG. 2). Peripheral rollers maintain end 15a in concentric alignment with axis 14 as conduit 15 is rotated about axis 14. Conduit 15 is sufficiently rigid so that the conduit need only be supported by engagement of the offset end 15b with the rotatable plate 20 to maintain the free end 15a in postion as shown in FIG. 1. That is, in the embodiment shown the non-offset end 15a is maintained in axial alignment with central axis 14 by the rigidity of conduit 15 and the peripheral rollers that prevent lateral displacement of free end 15a. Conduit 15 includes a second flanged end 15b carried by a rotateable plate 20. Note conduit 15 is provide with an offset shape with first end 15a concentrically located with respect to axis 14 and second end 15b offset from axis 14. In the present invention free end 15a can be rotated about axis 14 while maintaining continual concentric alignment of free end 15a with inlet conduit 21 while the second end 15b is angularly postionable about axis 14 and can be brought into or out of flow alignment with any of a plurality of outlet conduits. The second end 15b of rotateable conduit 15 is carried by rotateable plate 20 which includes a bearing 23 that mounts in second end 13 to permit rotation of plate 20 about central axis 14 to thereby enable the second end 15b of rotateable conduit to be angularly positioned with respect to any of the plurality of outlet housings three of which are identified in FIG. 1 as 30, 31 and 32 while the free end 15a of conduit maintains flow alignment with inlet conduit 15. Thus conduit 15 has sufficient rigidity to maintain its shape during rotation of conduit 15 about axis 14 as well as to maintain its postion when materials are directed through the rotatable conduit.

In order to seal the ends of the rigid rotatable conduit once the conduit has been properly aligned I provide a set of seals. Located in first end 12 is a first annular inflatable seal 40 which is shown in sealing engagement with flange 41. Similarly located on the second end 13 of housing 11 is a second annular inflatable seal 39 for sealing and holding outlet housing 30 in conveying condition while preventing material from being accidentally discharging therefrom. Inflatable seals are connected to a source of pressurized air (not shown) for inflating the seals with the inflatable seals having an uninflated condition where the seals are not in contact with the ends of the rotateable conduit so that the seals do not inhibit rotation of the rotateable conduit 15 about axis 14.

To rotate rotateable conduit 15 from a first conveying condition to a second conveying condition there is included a drive system 38 that includes a drive motor 43, a gear reduction box 29 that reduces the speed of rotation of the drive motor 43 and a drive sprocket 46. A link drive chain 44 connects drive sprocket 46 to a sprocket wheel 42 which is fixedly and circumferentially connected to the end 15a of repositionable conduit 15 which is central located about central axis 14. Located in engagement with drive chain 44 is an idler sprocket 48 that maintains chain 44 in a taught condition thereby minimizing hysteresis in the drive system 38. The drive motor 43 is operable for rotating sprocket 42 which in turns rotates free end 15a about central axis 14. By rotating free end 15a one can rotate the repositionable conduit 15 from a first conveying condition where first conduit end 15b is in alignment with outlet housing 30 to a second conveying condition where conduit end 15b is in alignment with any of the other outlet housings 31, 32, 33, 34, 35, and 36 which are shown in end view in FIG. 3.

FIG. 2 shows that rotateable conduit free end 15a includes a flange 41 that is rotatably supported by rollers 45a, 45b, 45c, and 45d, which are arranged in a square pattern to thereby maintain rotational support for flange 41 about axis 14. It will be noted that first end 15a of rotateable conduit 15 is free of fixed engagement with housing 11, but that the second end 15b is affixed to rotateable plate 20 so that rotation of rotatable plate 20 about axis 14 moves the conduit offset end 15b, angularly about axis 14.

Figure 3:
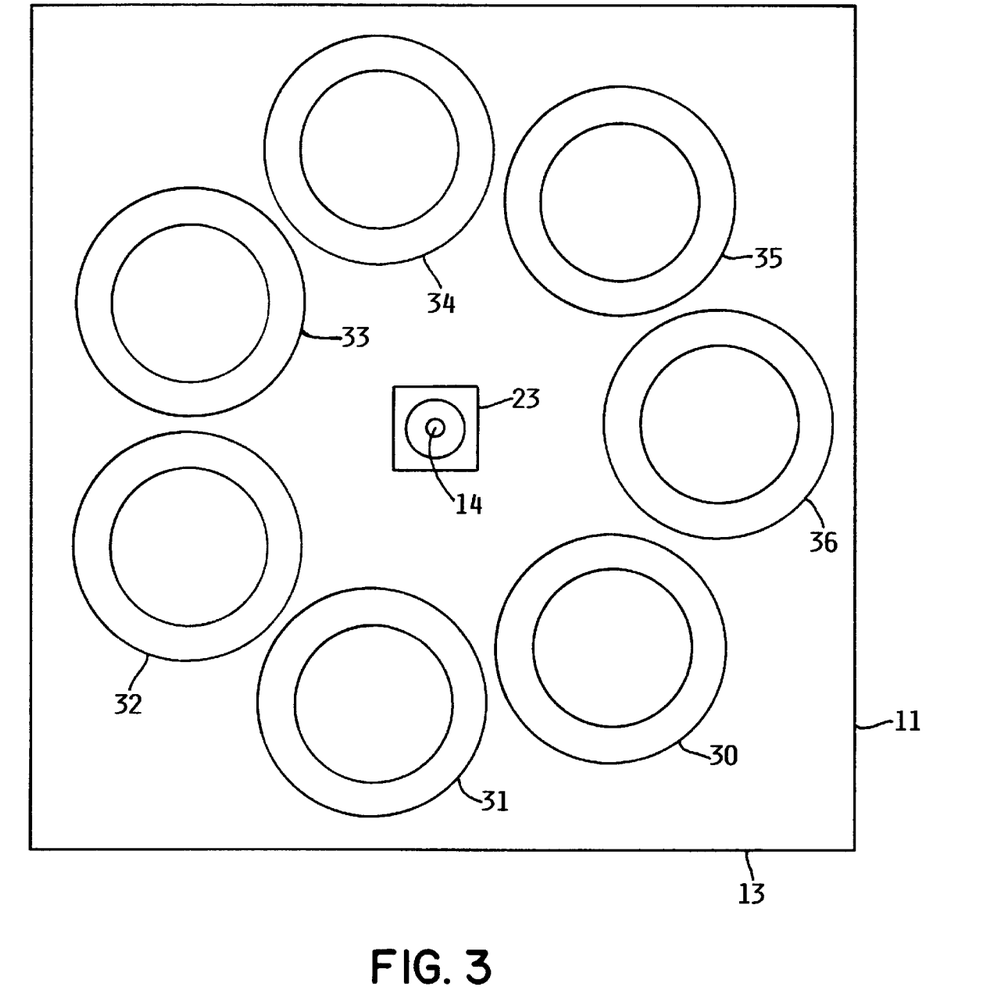
FIG. 3 is an end view of the multi-port switch of FIG. 1.

FIG. 3 shows an end view of switch housing 11 showing multiple outlet housing or outlet ports 30, 31, 32, 33, 34, 35, and 36 located in equally spaced distances from central axis 14. In the embodiment shown, seven outlet ports are shown, however, more or less can be used depending on the size and radial spacing of the outlet ports, as well as the angular spacing of the outlet ports about axis 14. In operation, any or all of the outlet housings can be connected to further conduits.

Figure 4:
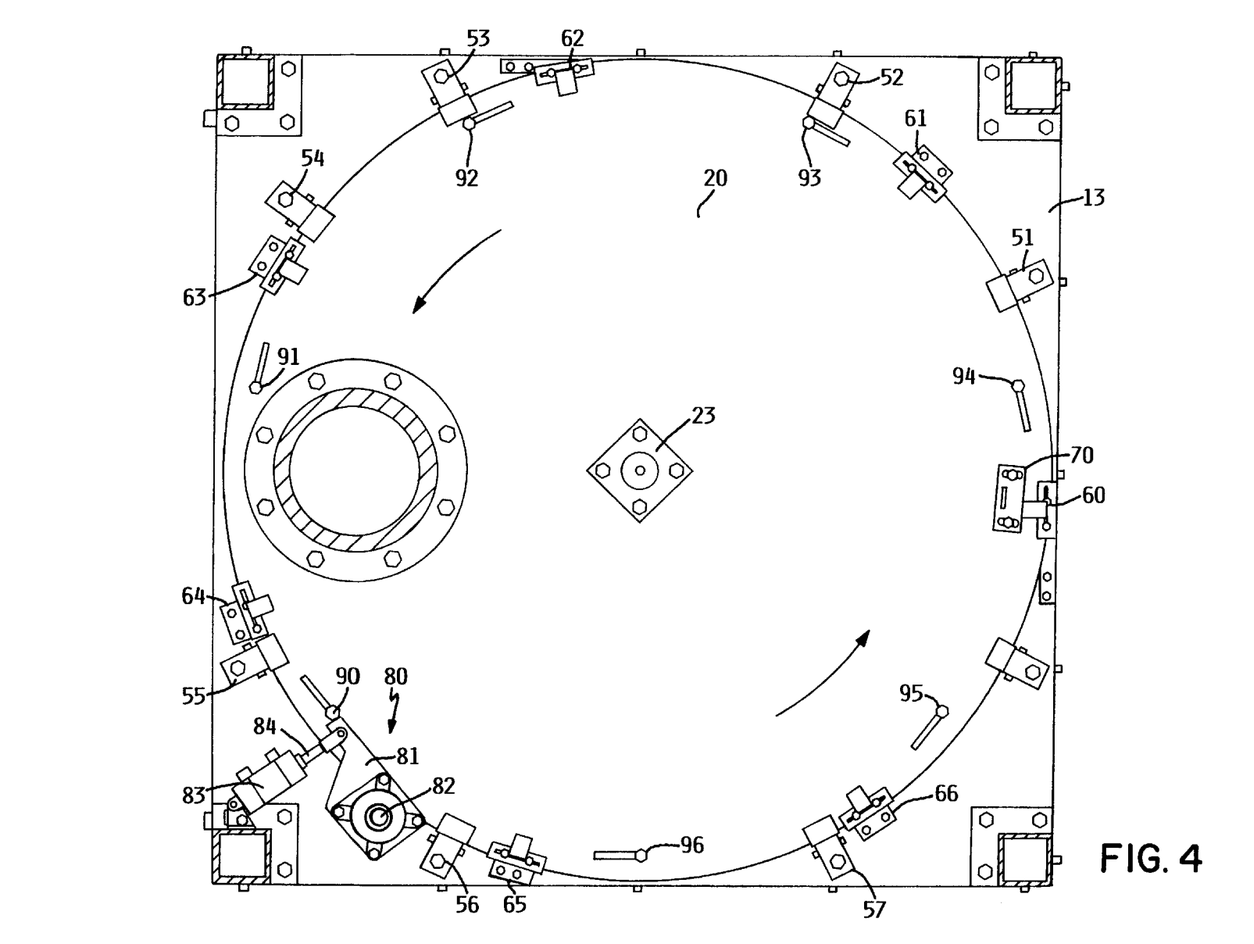
FIG. 4 is a sectional view taken along lines 44 of FIG. 2.
Figure 8:
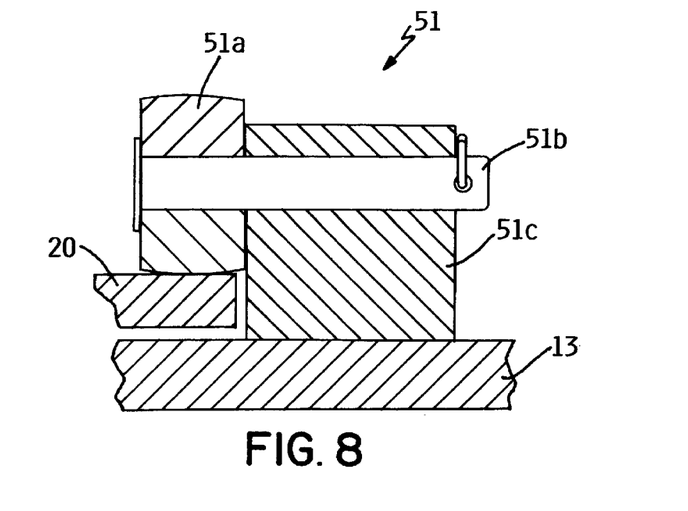
FIG. 8 is a partial sectional view showing a roller for maintaining the rotatable plate in the proper horizontal plane.

FIG. 4 shows a circular rotatable plate 20 which is rotatable supported by bearing 23 that attaches to rotatable plate 20 and housing end 13. Rotatable plate 20 is held in postion proximate end member 13 by rollers 51, 52, 53, 54, 55, 56 and 57. As all the rollers are identical only one will be described herein. FIG. 8 shows roller 51 having a roller housing 51c that attaches to housing 13 with a shaft 51b extending through housing 51c. A wheel 51a rotates on shaft 51b with the periphery of wheel 51a engaging the peripheral region of plate 20 to hold plate 20 thereunder in a condition that permits rotation of plate 20 with respect to housing 13 while maintain plate 20 and end member 14 proximate to each other.

The afore described drive system 38 of the present invention also functions as a brake to prevent back rotation of the rotatable plate 29 through the gear reduction drive 39. That is, the gear reduction mechanism 39 can have a revolution reduction between the output shaft and the input shaft on the order of 40 to 1 (i.e. 40 revolutions of the input shaft to gear reduction mechanism 39 produce only one revolution of the output shaft). To appreciate the drive system functions as brake one must note that the force to run the gear reduction drive in the reverse direction is relatively high i.e. forty revolutions of sprocket wheel 41 to one revolution of drive sprocket 46. Thus, the gear reduction mechanism in the drive system functions as a brake to prevent back rotation rotatable plate 20 once the power to the drive motor is shut off.

Figure 5:
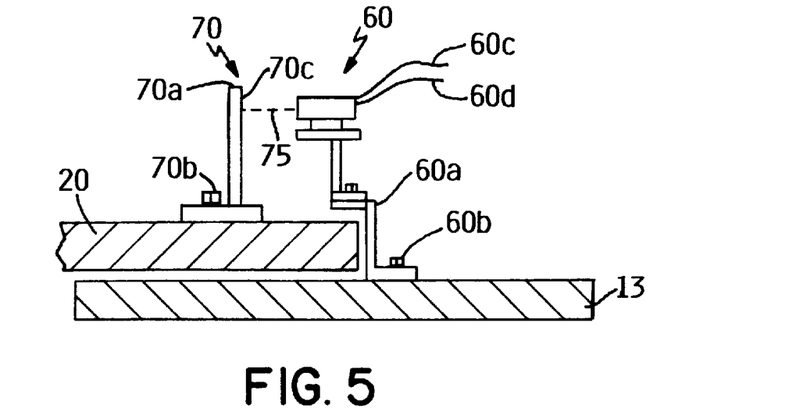
FIG. 5 is a partial sectional side view showing the photoelectric alignment system and reflector.
Figure 6:
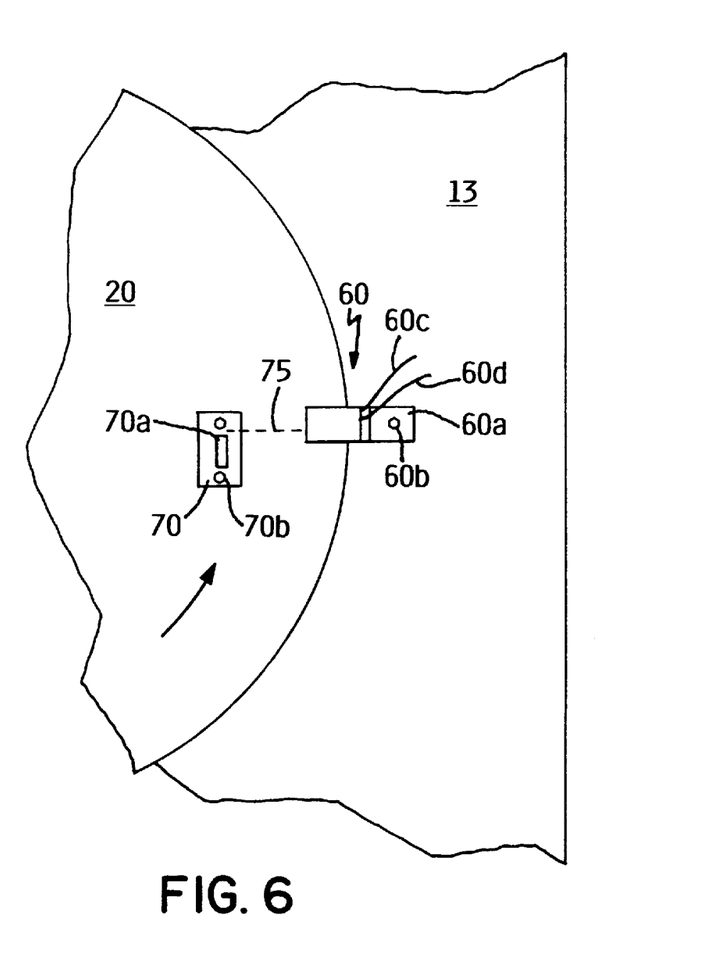
FIG. 6 is a top view showing the photoelectric alignment system and reflector.

In order to properly postion the offset end 15b with respect to the outlet ports I provide for a reflector and a photoelectric alignment system. FIG. 4 shows a set of 7 photoelectric alignment systems 60, 61, 62, 63, 63, 65, and 66 that are mounted on housing 13 that include a light emitter that directs a light beam radially inward so that the light beam can be reflected by a reflector 70 mounted on rotatable plate 20. To illustrate the reflector and photoelectric sensor reference should be made to FIG. 5 which shows a side view and FIG. 6 which shows a top view of rotatable plate 20 with reflector 70 secured to plate 20 by fastener 70b. Reflector 70 includes an upright member 70a having a front reflective surface 70c for reflecting a light beam back to photoelectric alignment system 60. The photoelectric alignment system 60 is shown mounted on a bracket 60a that is fastened to housing 13 through bolt 60b . Extending rearward from photoelectric alignment system 60 are electrical leads 60c and 60d. A light beam 75 is shown as issuing from photoelectric alignment system 60 at the moment the reflector cross the path of light beam 75. In this postion the light beam is reflected back into the photo sensor in photoelectric alignment system 60 which sends a signal through electrical leads 60c and 60d to shut the power to the drive system 38. Photoelectric alignment system 60 is a commercial available system that emits a light beam and detects the reflection of the light beam. One such photoelectric alignment system is more fully shown and describe in U.S. Pat. No. 5,356,393. Thus the photoelectric alignment system 60 detects a light beam reflection from a reflector 70 on the rotatable plate 20 when the rotatable plate carries reflector 70 in front of photoelectric alignment system 60 which in tun sends a signal through leads 60c and 60d to shut the power off to the drive motor 43 and thereby stops further forward rotation of the rotatable plate 20. While only one photoelectric alignment system 60 has been described the remaining photoelectric alignment systems operate in an identical manner when the reflector 70 crosses the path of the light beam emanating therefrom. Of course one can deactivate any of the photoelectric alignment system so that the rotatable plate 20 can continue to rotate until another outlet housing is in alignment with outlet end 15b.

Figure 7:
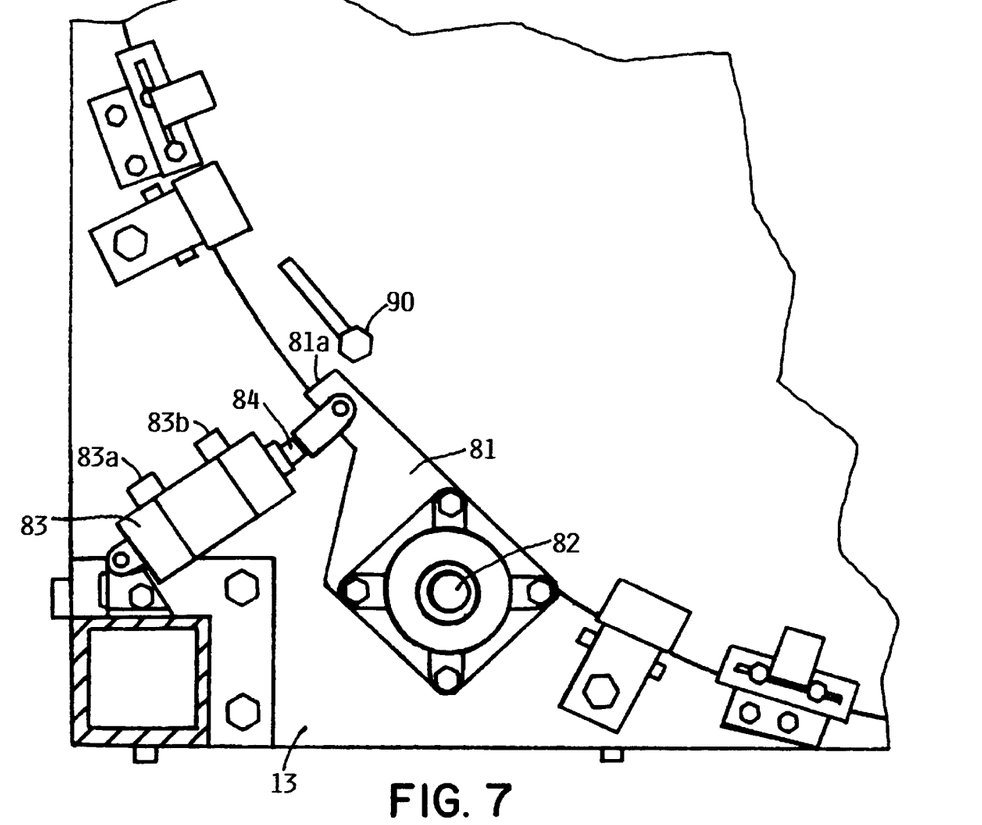
FIG. 7 is a top view showing the pivotal locking arm in the retracted position.

The present invention includes a stop system 80 that includes mechanical stop that is engaged by a pivot arm when the outlet port is properly positioned. The mechanical stop prevents further rotation of rotatable conduit 15 until the mechanical stop is disengaged thereby ensuring that the rotatable plate will not be accidentally rotated when material is being conveyed through the conduits or when the conduits ends are being brought into sealing relationship with one another. FIG. 4 shows that rotatable plate 20 includes a set of 7 stops 90, 91, 92, 93, 94, 95, and 96 which are affixed to and extend upward from rotatable plate 20. In operation, a stop forms temporary engagement with a pivotal arm 82 that is pivotally supported by shaft 82 which is carried by housing end member 13. Stop system 80 also includes a solenoid cylinder 83 that has an extendible arm 84. Extendible arm 84 is shown in the extended postion in FIG. 4 so that arm 81 is in engagement with stop 90 to prevent further forward rotation of rotatable plate 20. FIG. 7 which is a partial view of the stop system 80 shown in FIG. 2 shows plate 20 in the rotatable postion. That is, pivot arm 81 has been retracted so end 81a clears stop 90 to allow plate 20 to rotate in a counterclockwise direction. Solenoid 90 includes postion sensor leads 83b and 83a that send a signal to the drive system 38 to allow the drive system to rotate once the pivot arm 84 is in the retracted condition. Conversely, when the arm 84 is in the extended postion (FIG. 8)the drive system 38 is deactivated Once the conduit end 15b is in concentric alignment with one of the outlet housings, annular inflatable seal 39 and annular inflatable seal 40 are inflated to seal the ends of offset conduit 15 within switch housing 11 to thereby hold the offset conduit in the first conveying condition which prevents material from being accidentally discharged from the junction of conduit 15b with end housing 13 and the junction of conduit end 15a with end housing 12.

Thus the present invention includes a rotateable offset conduit having a first end laterally restrained but rotateable about a central axis and a second end laterally offset from the central axis to form non-concentric nonalignment with the central axis but secured to a rotateable member so that when the rotateable member is rotated about the central axis the second end of the offset conduit can be moved to another conveying condition while the first end of offset conduit can be maintained in concentric alignment with the central axis.

Thus, the operation of the present invention involves the method of moving an offset pneumatic conduit from a first conveying condition to a second conveying condition by releasing the seals 39 and 40 on the conduit 15 to permit rotation of the conduit about central axis, rotating the offset conduit, stopping the rotation of the offset conduit with a photoelectric alignment system that sends a signal to shut off the power to the drive system to thereby stop rotateable conduit 15b in a second conveying condition where the rotatable conduit end 15b is in concentric flow alignment with one of the other outlet ports. Once the conduit is in concentric flow alignment, one inflates the seals 39 and 40 to secure the ends of the rotateable conduit 15 in the second fluid conveying condition.

I claim:

1. A multi-port pneumatic switch for a conveying line comprising:
    a switch housing, said switch housing having a first end and a second end;
    a central axis extending through said first end and said second end;
    a first conduit carried by said first end;
    a plurality of conduits carried by said second end;
    a rotateable plate mounted in said switch housing, said rotateable plate rotateable about said central axis;
    an offset conduit located in said housing, said offset conduit having a first end supported by said rotateable plate in a postion of non-concentric nonalignemnt with the central axis and a second end rotatably supported in concentric alignment about the central axis by said first end of said switch housing;
    a drive mechanism for rotating said offset conduit about said central axis to move said offset conduit from a first conveying condition to a second conveying condition;
    a reflector mounted on said rotatable plate for rotation therewith;
    a photoelectric alignments system for emitting a light beam therefrom that is reflected back to said photoelectric alignments system when the light beam impinges on the reflector so that when said rotatable plate is rotated to a condition where the light beam impinges on the reflector a signal is sent from the photoelectric alignment system to shut the power to the drive mechanism to prevent further rotation of said rotatable plate; and
    a first seal and a second seal for sealing said offset conduit within said switch housing to thereby hold said offset conduit in the first conveying condition while preventing material from being accidentally discharging therefrom.

2. The multi-port pneumatic switch of claim 1 including a set of at least three rollers for rotatably supporting said offset conduit.

3. The multi-port pneumatic switch of claim 2 including a sprocket wheel fixedly connected to one end of said offset conduit.

4. The multi-port pneumatic switch of claim 3 including a drive chain and idler for maintaining said drive chain in a responsive condition.

5. The multi-port pneumatic switch of claim 2 wherein said rollers are arranged in a square pattern to provide external rotateable support to said offset conduit.

6. The multi-port pneumatic switch of claim 1 including at least three outlet housings.

7. The multi-port pneumatic switch of claim 1 including a pneumatic cylinder for extending or retracting said stop pin.

8. The multi-port pneumatic switch of claim 1 wherein said seals comprise annular inflatable seals.

9. The multi-port pneumatic switch of claim 1 wherein the drive motor is contained within the switch housing.

10. The multi-port pneumatic switch of claim 1 wherein the offset conduit is rigid.

11. The method of moving a pneumatic conduit from a first conveying condition to a second conveying condition comprising the steps of:
    releasing a rotateable conduit to permit rotation of said rotateable conduit about a central axis;
    rotating said rotateable conduit until said rotateable conduit is almost in the second conveying condition;
    extending a pin stop into a cavity in a convergent stop;
    continuing to rotate the rotateable conduit until said pin stop comes into lateral engagement with a pin engagement surface in said convergent stop to thereby stop said rotateable conduit in the second conveying condition;
    engaging a set of seals to secure the ends of the rotateable conduit in the second fluid conveying condition.

12. The method of claim 11 including the step of engaging a pivot arm to prevent further rotation.

13. The method of claim 12 including the step of inflating the seals to bring the seals into engagement with the rotateable conduit.

14. The method of claim 12 including rotating said rotateable conduit with a drive motor.

15. The method of claim 14 including the step of pivoting a pivot arm into engagement with a stop on the rotatable conduit to prevent further rotation of the rotatable plate.

16. A multi-port switch comprising;

a housing, said housing carrying an inlet and an outlet;

a rotateable conduit having a first end and a second end, said rotateable conduit having a first end laterally restrained but rotateable about a first axis, said rotateable conduit having a second end laterally offset from said axis so that when said rotateable conduit is rotated about said axis said second end can be moved to a conveying condition whereby said second end of said rotateable conduit is in alignment with the outlet to thereby permit material to be pneumatically conveyed from said inlet to said outlet; and an extendible stop for stopping rotation of said rotateable conduit when said rotateable conduit is in the conveying condition with said extendible stop extended prior to the rotateable conduit arriving at the conveying condition.

17. The multi-port pneumatic switch of claim 16 including a pneumatic cylinder for extending and retracting said extendible stop.

18. The multi-port pneumatic switch of claim 17 including a drive motor mounted in said housing for rotating said rotateable conduit into the conveying condition.

* * * * *